United States Patent
Peled et al.

(10) Patent No.: US 7,493,650 B2
(45) Date of Patent: Feb. 17, 2009

(54) APPARATUS AND METHOD FOR ENSURING COMPLIANCE WITH A DISTRIBUTION POLICY

(75) Inventors: Ariel Peled, Even-Yehuda (IL); Lidror Troyansky, Givataim (IL); Ofir Carny, Kochav-Yair (IL)

(73) Assignee: PortAuthority Technologies Inc., San Diego, CA (US)

( * ) Notice: Subject to any disclaimer, the term of this patent is extended or adjusted under 35 U.S.C. 154(b) by 590 days.

(21) Appl. No.: 10/881,181

(22) Filed: Jul. 1, 2004

(65) Prior Publication Data

US 2005/0027980 A1    Feb. 3, 2005

Related U.S. Application Data

(60) Provisional application No. 60/483,640, filed on Jul. 1, 2003.

(51) Int. Cl.
G06F 21/00  (2006.01)
(52) U.S. Cl. .......................................................... 726/1
(58) Field of Classification Search .................. 713/164; 726/1
See application file for complete search history.

(56) References Cited

U.S. PATENT DOCUMENTS 5,841,869 A * 11/1998 Merkling et al. ............ 713/164
6,167,445 A * 12/2000 Gai et al. .................... 709/223
6,832,248 B1 * 12/2004 Byrnes ........................ 709/223
2002/0129140 A1   9/2002 Peled et al.
2003/0149732 A1   7/2003 Peled et al.

FOREIGN PATENT DOCUMENTS

| WO | WO 02/077847 | 3/2002 |
|----|--------------|--------|
| WO | WO 2004/040464 | 5/2004 |

* cited by examiner

*Primary Examiner*—Gilberto Barron, Jr.
*Assistant Examiner*—Cordelia Kane

(57) ABSTRACT

A method for determining compliance with a data distribution or usage policy applied with respect to a digital medium is presented. The method comprising: assigning numerical values to breaches of the policy; assigning a quota of breaches of the policy to at least one user subjected to the policy, the quota being expressed in terms of the numerical value; monitoring information distribution or usage covered by the policy in order to detect breaches of the policy by users; upon detection of an action breaching the policy by a given one of the users: determining whether a numerical value has been assigned to the type of the breach; comparing the numerical value assigned to the type of breach with a respective quota assigned to the given user, and allowing the action to be executed only if the comparing indicates that the respective quota assigned to the given user is sufficient to cover the breach.

33 Claims, 11 Drawing Sheets

| Process \ Requirements | 1 | 2 | 3 |
|---|---|---|---|
| A | 6 | 8 | 9 |
| B | 9 | 5 | 0 |
| C | 0 | 7 | 4 |
| D | 9 | 3 | 2 |
| E | 4 | 9 | 9 |
| F | 6 | 0 | 8 |

Fig. 11

APPARATUS AND METHOD FOR ENSURING COMPLIANCE WITH A DISTRIBUTION POLICY

CROSS-REFERENCE TO RELATED APPLICATIONS

This application is related to and claims priority from U.S. Provisional Patent Application No. 60/483,640, filed Jul. 1, 2003, the contents of which are hereby incorporated herein by reference in their entirety.

FIELD OF THE INVENTION

The present invention relates to monitoring and enforcing a distribution policy with respect to digital items, more particularly but not exclusively to methods that enable better management of both quantitative and qualitative aspects of a distribution policy.

BACKGROUND OF THE INVENTION

The information and knowledge created and accumulated by organizations and businesses are their most valuable assets. As such, managing and keeping the information and the knowledge inside the organization and restricting its distribution outside is of paramount importance for almost any organization, government entity or business, and provides a significant leverage of its value. Most of the information in modern organizations and businesses is represented in a digital format. Digital content can be easily copied and distributed (e.g., via e-mail, instant messaging, peer-to-peer networks, FTP and web-sites), which greatly increase hazards such as business espionage and data leakage. In addition, the distribution of digital item requires resources, such as costly bandwidth and precious employees time.

Another aspect of the problem is compliance with regulations with respect to information: Regulations within the United States of America, such as the Health Insurance Portability and Accountability Act (HIPPA), the Gramm-Leach-Bliley act (GLBA) and the Sarbanes Oxley act (SOXA) implies that the information assets within organizations should be monitored and subjected to an information management policy, in order to protect clients privacy and to mitigate the risks of potential misuse and fraud. In particular, the existence of covert channels of information, which can serve conspiracies to commit fraud or other illegal activities, pose severe risk from both legal and business perspectives.

Assigning a distribution and usage policy to digital items is therefore of great importance for the mitigation of the hazards and perils of unauthorized transport and for saving costly resources. However, in most cases, the distribution policy is hardly ever fully fulfilled: as with most pre-determined set of rules, many exceptions to the rules occur due to the varying needs in our ever-changing world and the fact that it is very hard, if not impossible, to anticipate all the possible scenarios and circumstances to which the predetermined rules should apply.

Furthermore, in general, there are many parameters that compliance is driven from, and those parameters may have several values. Therefore, compliance can be considered as a matrix, where the columns are the different requirements and the rows are systems and processes. Hence, in most cases, the result of an audit that was performed is a report that lists those issues rather than a simple yes or no.

Prior art solutions use mainly cumbersome manual solutions to overcome the problem—e.g., correcting and updating the distribution policy or providing an ad-hoc solution to any justified breach of the distribution policy.

There is thus a recognized need for, and it would be highly advantageous to have, a method and system that allows efficient management of quantitative and qualitative aspects of compliance with the distribution policy, which overcomes the drawbacks of current methods as described above.

SUMMARY OF THE INVENTION

The present invention seeks to provide a novel method and system for managing the quantitative and qualitative aspects of compliance with the distribution policy.

According to a first aspect of the present invention, a method for determining compliance with a data distribution or usage policy applied with respect to a digital medium is presented. The method comprising: Assigning numerical values to breaches of the policy; Assigning a quota of breaches of the policy to at least one user subjected to the policy, where the quota being expressed in terms of the numerical value; Monitoring information distribution or usage covered by the policy in order to detect breaches of the policy by users, and, upon detection of an action breaching the policy by a given one of the users:

Determining whether a numerical value has been assigned to the type of the breach.

Comparing the numerical value assigned to the type of breach with a respective quota assigned to the given user, and Allowing the action to be executed only if the comparing indicates that the respective quota assigned to the given user is sufficient to cover the breach.

In a preferred embodiment of the present invention, the method further comprising deducting the numerical value assigned to the type of breach from the respective quota assigned to the given user.

In a preferred embodiment of the present invention, wherein the data distribution or usage policy comprises determining a legitimacy of at least one of the following:

A set of authorized recipients;

A set of authorized usages;

A set of allowed formats;

A set of allowed distribution channels, and

A required action.

In a preferred embodiment of the present invention, the method further comprising sending reports to users regarding the status of a respective quota.

In a preferred embodiment of the present invention, the method further comprising sending warnings to users whenever a respective remaining quota is low.

In a preferred embodiment of the present invention, wherein the quota is assigned on a time basis.

In a preferred embodiment of the present invention, wherein the quota is assigned based on credits that are assigned to the at least one user.

In a preferred embodiment of the present invention, the quota is assigned based on a property attached to the at least one user.

In a preferred embodiment of the present invention the quota is correlated with a property, the property being based on at least one of:

The level of the at least one user within the organization;

The department to which the at least one user belongs, and

The past behavior of the at least at one user.

In a preferred embodiment of the present invention the quota is assigned to users based on a default policy.

In a preferred embodiment of the present invention the required action comprises at least one of the following:
Preventing distribution of the digital item;
Preventing storage of the digital item;
Preventing usage of the digital item;
Reporting distribution of the digital item;
Reporting storage of the digital item;
Reporting usage of the digital item;
Reporting;
Alerting about distribution of the digital item;
Alerting storage of the digital item;
Alerting usage of the digital item; alerting;
Logging distribution of the digital item;
Logging storage of the digital item;
Logging usage of the digital item;
Logging;
Notifying about distribution of the digital item;
Notifying about storage of the digital item;
Notifying about usage of the digital item;
Notifying;
Notifying to an administrator;
Notifying to a manager;
Notifying to a recipient;
Notifying to a sender;
Notifying to an owner of the digital item;
Quarantine;
Alerting an administrator;
Alerting a manager;
Alerting a recipient;
Alerting a sender;
Alerting an owner of the digital item;
Reporting to an administrator;
Reporting to a manager;
Reporting to a recipient;
Reporting to a sender;
Reporting to an owner of the digital item;
Encrypting the digital item;
Changing the digital item;
Replacing an information object with the digital data item; and
Utilizing digital rights management technology on the digital item.

In a preferred embodiment of the present invention, the usage comprises at least one of the following:
Storage;
Copying a file;
Copying an excerpt;
Editing;
Copying to clipboard;
Copying an excerpt to clipboard;
Changing format;
Changing encoding;
Renaming a file;
Encryption;
Decryption;
Changing digital management;
Opening by an application; and
Printing.

In a preferred embodiment of the present invention, the distribution policy comprises distribution regulation, the distribution regulation being for regulating at least one of the following:
Sending the digital item via mail;
Sending the digital item via web mail;
Uploading the digital item to a web server;
Uploading the digital item to a FTP server;
Sending the digital item via a file transfer application;
Sending the digital item via an instant messaging application;
Sending the digital item via a file transfer protocol; and
Sending the digital item via an instant messaging protocol.

In a preferred embodiment of the present invention, wherein the numerical value assigned to at least one type of breach of the security policy corresponds to the level of offence of the type of breach.

In a preferred embodiment of the present invention, the property is a multi-dimensional function, and wherein the method comprising using the function to assign the quota to a respective user.

In a preferred embodiment of the present invention, the property is a non-linear accumulation function, and wherein the method comprising using the function to assign the quota to a respective user.

In a preferred embodiment of the present invention, the method comprising assigning quotas to respective users within an organization according to their respective positions within an organizational structure.

In a preferred embodiment of the present invention the assigning is according to the vertical position or the horizontal position within the structure.

In a preferred embodiment of the present invention the digital medium comprises a distribution channel or storage medium.

According to a second aspect of the present invention, a method for automatically estimating a compliance table is presented, the compliance table comprising requirements for compliance with a policy for data distribution or usage over a communication network, the method comprises:
Constructing a compliance table, the table comprising cells, the cells having a first dimension representing the requirements for compliance with the policy and the cells having a second dimension representing subjects for the data distribution or usage;
Initializing values in the table to an a-priori set of compliance values;
Assigning a numerical value to at least one type of breach for at least a subset of the cells within the table;
Monitoring information distribution or usage covered by the policy in order to detect breaches of the policy;
Upon detection of a breach of the policy, updating the set of compliance values within the table.

In a preferred embodiment of the present invention, the subjects for the data distribution or usage are any one of a group comprising: a set of processes, a set of processors, a set of computing systems, a set of network nodes and a set of data distribution channels.

In a preferred embodiment of the present invention, the method further comprising evaluating the total compliance score based on the compliance table.

In a preferred embodiment of the present invention, the method further comprising providing a final decision regarding compliance based on the compliance table.

In a preferred embodiment of the present invention, the a-priori set of compliance values is determined manually;

According to another aspect of the present invention, an apparatus for determining compliance with a data distribution or usage policy applied with respect to a digital medium, the apparatus comprising:
A first module of a policy reference monitor for assigning numerical values to breaches of the policy;
A quota assignor for assigning a quota of breaches of the policy to at least one user subjected to the policy, the quota being expressed in terms of the numerical value;

A traffic monitor and analyzer for monitoring information distribution or usage covered by the policy in order to detect breaches of the policy by users;

A second module of a policy reference monitor which, upon detection of an action breaching the policy by a given one of the users:

Determining whether a numerical value has been assigned to the type of the breach;

Comparing the numerical value assigned to the type of breach with a respective quota assigned to the given user, and Allowing the action to be executed only if the comparing indicates that the respective quota assigned to the given user is sufficient to cover the breach, and Instructing the quota assignor to deduce the deducting the numerical value assigned to the type of breach from the respective quota assigned to the given user.

In a preferred embodiment of the present invention, the quota is defined on a time basis—e.g., "10 personal video clips of up to 2 Mbytes each, per month".

In a preferred embodiment of the present invention, the policy can assign credits based on both horizontal and vertical compartmentalization within the organization, i.e., the quota is determined both according to the management level and the department or section within the organization.

In a preferred embodiment of the present invention, the system allows traffic that exceeds the quota to remain in "quarantine", until released by an authorized person or entity. According to a pre-defined policy, a message that was found to exceed the quota is stored, and a report about the event is sent to the sender and/or other authorized persons or entities. The authorized person inspects the message and decide whether or not to "release" it from "quarantine".

In a preferred embodiment of the present invention, a default policy regarding the allotted quota is assigned to each person in the organization, according to the various departments within the organization and the rank of the person within the organization.

In a preferred embodiment of the present invention, a default policy is assigned with respect to the groups of users versus groups of types: e.g., people in the legal department are allowed to send 5 video-clips and 3 songs per month.

In a preferred embodiment of the present invention the quotas assigned to various members are with respect to the quantity of content to which security policy was not assigned.

In a preferred embodiment of the present invention, the system allows for management of qualitative aspects of compliance: the level of offense of each unauthorized action may be designated by giving a rank attribute to each such unauthorized action that corresponds to the level of offense for this action.

The present invention successfully addresses the shortcomings of the presently known configurations by providing a method and system for efficient management of qualitative and quantitative acts of distribution and usage policy, which can efficiently serve current needs for network security.

BRIEF DESCRIPTION OF THE DRAWINGS

For a better understanding of the invention and to show how the same may be carried into effect, reference will be made, purely by way of example, to the accompanying drawings.

In the drawings:

FIG. 11 illustrates a matrix of compliance, where the columns are the different requirements and the rows are systems and processes, according to a preferred embodiment of the present invention.

DETAILED DESCRIPTION OF PREFERRED EMBODIMENTS

Figure 1:
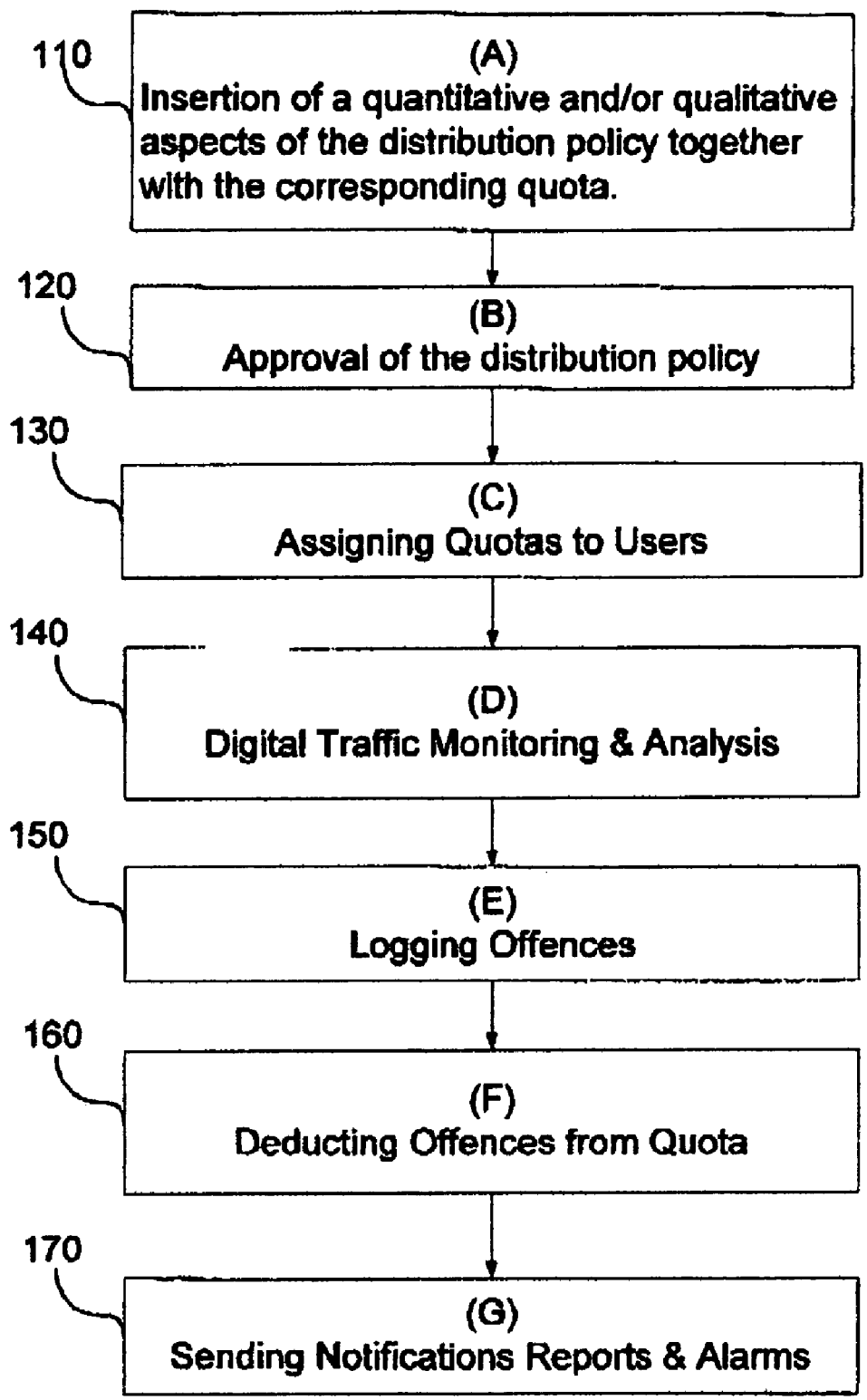
FIG. 1 is a simplified flowchart that illustrates the method for managing the quantitative and qualitative aspects of compliance with the distribution policy, constructed and operative according to a first preferred embodiment of the present invention.

The present embodiments seek to provide a novel method and system for managing various quantitative and qualitative aspects of compliance with the distribution policy.

Before explaining at least one embodiment of the invention in detail, it is to be understood that the invention is not limited in its application to the details of construction and the arrangement of the components set forth in the following description or illustrated in the drawings The invention is capable of other embodiments or of being practiced or carried out in various ways. In addition, it is to be understood that the phraseology and terminology employed herein is for the purpose of description and should not be regarded as limiting. In the following discussion, we will use the terms "breach" and "offense" interchangeably.

According to a first aspect of the present invention, a "breach quota" is assigned to at least one attribute of the distribution policy. The breach quota determines the allotted incompliance with the distribution policy. For example, the distribution policy may not allow, in general, distributing of content with attached video clips, but, for example a quota of 5 attached video-clips per user per month may be assigned to any user.

Reference is first made to FIG. 1, which is a simplified flowchart that illustrates the method for managing the quantitative and qualitative aspects of compliance with the distribution policy, constructed and operative according to a preferred embodiment of the present invention. According to the method, while determining the distribution policy the system administrator, the IT manager or any other authorized person or entity, inserts a quantitative and/or qualitative aspects of the distribution policy together with the corresponding quota (stage A, indicated by 110). The distribution policy is preferably subjected to a process of approval (stage B, indicated by 120). According to the distribution policy, credits and quotas are assigned to the various users (stage C, indicated by 130). After the distribution policy is set, the digital traffic (e.g., e-mail, instant messenger etc.) are continuously monitored and analyzed (stage D, indicated by 140). Methods for digital traffic monitoring and analysis are described, e.g., in U.S. patent application Ser. No. 10/003,269, in PCT application IL02/00037 and in U.S. provisional application 60/422,128, the content of which are incorporated hereafter by reference. Each offense, breach or non-compliance with the distribution policy is then registered and logged (stage E, indicated by 150), and a numeric quantity that corresponds to the offense is deducted from the quota of the user that commits the offense (stage F, indicated by 160). Notifications and/or reports and/or alarms are then sent to the user that committed the offense and/or to other authorized persons within the organization. (stage G, indicated by 170)

Figure 2:
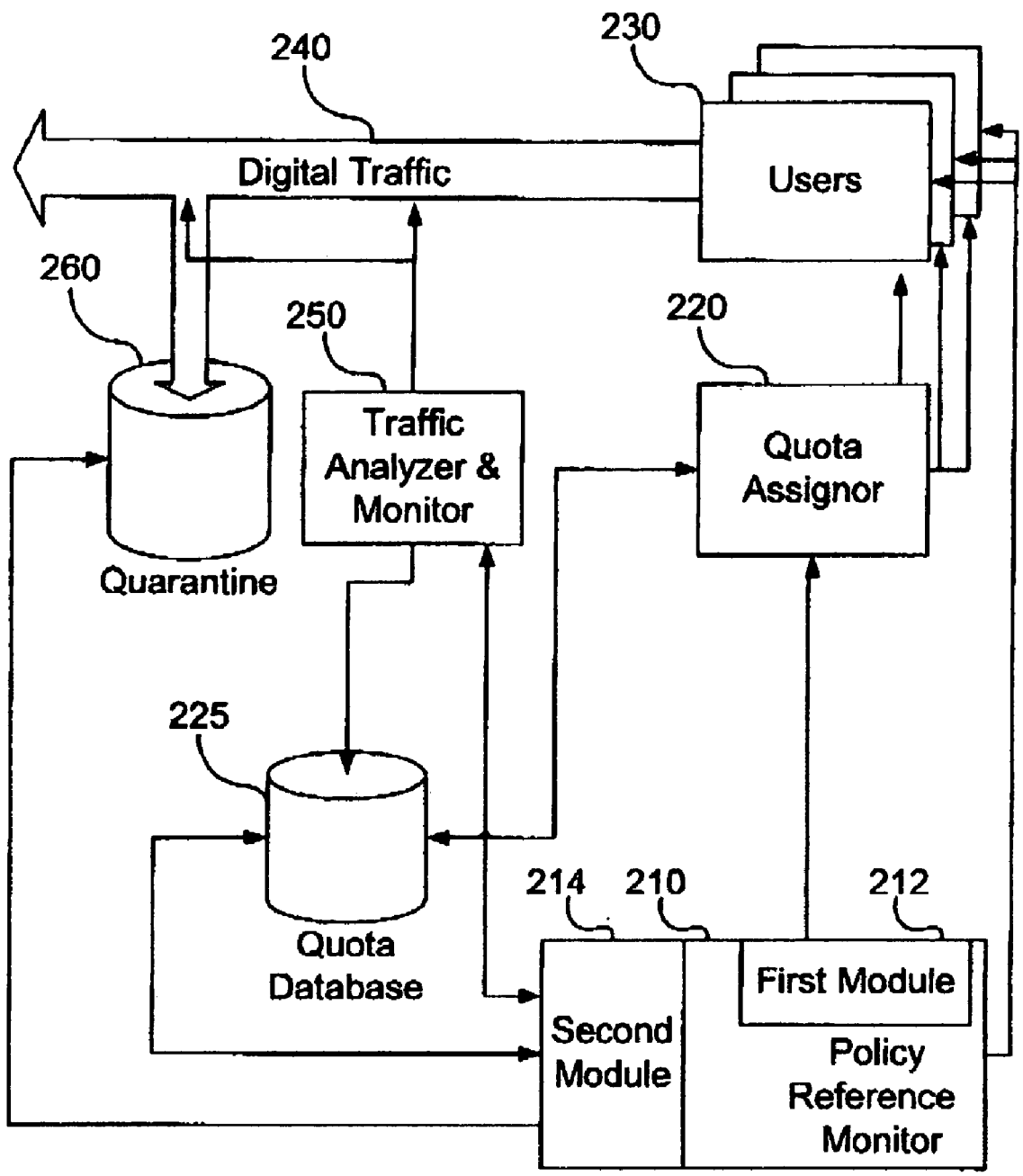
FIG. 2 is an illustration of a system for managing the quantitative and qualitative aspects of compliance with the distribution policy, constructive and operative according to a second preferred embodiment of the present invention.

Reference is now made to FIG. 2, which is an illustration of a system for managing the quantitative and qualitative aspects of compliance with the distribution policy, constructive and operative according to a preferred embodiment of the present invention The first module 212 of the policy reference monitor 210 instructs the quota assignor 220 to assign quota to the users 230. The assigned quota is registered in the quota database 225. The users produce digital traffic 240, which is monitored and analyzed by the traffic analyzer and monitor 250. The traffic analyzer and monitor 250 detects breaches and offenses within the traffic, and deduces the corresponding numerical quantity from the user's quota The traffic analyzer and monitor 250 preferably also reports about the breaches and the offenses to the second module 214 of the policy reference monitor 210. The policy reference monitor 210 preferably send notifications and/or reports and/or alarms to the user that committed the offense and/or to other authorized persons within the organization. In cases in which the users exceed the allotted quota, the digital traffic that corresponds to the offense is preferably blocked by the traffic analyzer and monitor 250 and stored in quarantine 260. An authorized person or entity may thereafter release the quarantined data.

Figure 3:
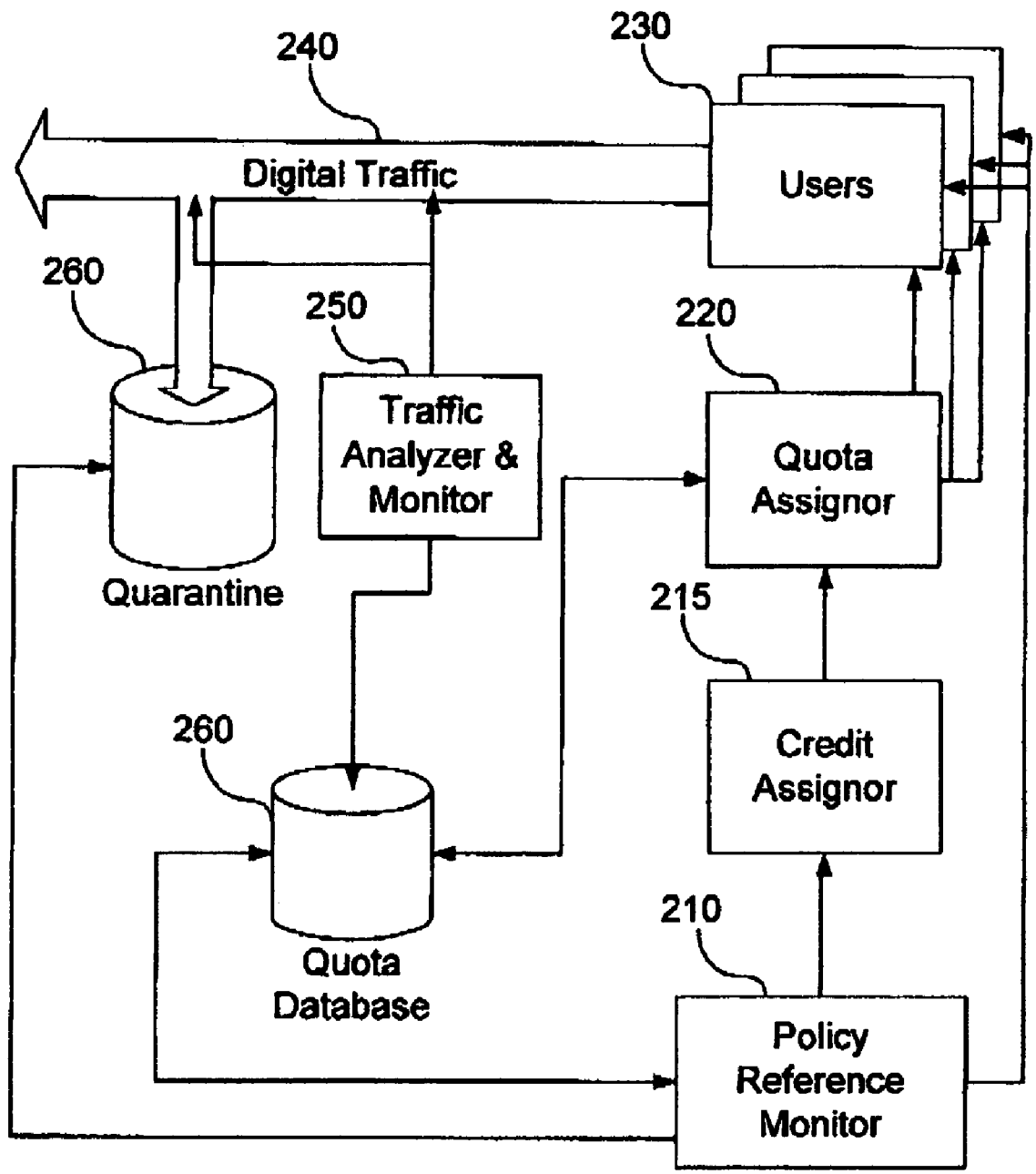
FIG. 3 illustrates a system, substantially similar to the one illustrated in FIG. 2, where the policy reference monitor use the credit assignor in order to assign credits that are thereafter transferred to quotas.

Reference is now made to FIG. 3, which illustrates a system, substantially similar to the one illustrated in FIG. 2, where the policy reference monitor use the credit assignor 215 in order to assign credits that are thereafter transferred to quotas.

In a preferred embodiment of the present invention, the system allows for management of qualitative aspects of compliance: the level of offense of each unauthorized action may be designated by giving a rank attribute to each such unauthorized action that corresponds to the level of offense for this action.

In a preferred embodiment of the present invention, a property or attribute is attached to an entity, regulating the policy in reference to the entity, this entity is preferably a user, but in other preferred embodiments of the present invention may be a group of users, a dynamically defined user or group of users (e.g. external users, the group of users working outside regular working hours, each user working outside regular working hours when considered separately) a department, or even a type of activity or activities related to a document or a group of documents. This property can preferably be correlated with a quota of regulated activity, thus a score or credits based on past behavior. Using such a property is a convenient method to take into amount and express past behavior when calculating the assigned policy.

In a preferred embodiment of the present invention, a specific activity of or relating to the entity can be allowed if and only if the property satisfies a condition, preferably, being higher than a specified or calculated value.

In a preferred embodiment of the present invention, the value of this property may change according to actions related to the entity (e.g. credits being assigned for prudent behavior and removed for potentially problematic behavior).

In a preferred embodiment of the present invention, credits are removed for performing the activity regulating by the property, essentially making it a quota for the regulated activity (possibly only in specific circumstances, e.g. only outside working hours, or when not approved by an authorized entity). In another preferred embodiment of the present invention, unsuccessful attempts to perform the regulated activity also affect the property, preferably to a lesser degree.

In a preferred embodiment of the present invention, several such properties may be associated with the same entity, or the property may comprise several "dimensions". In a preferred embodiment of the present invention, these dimensions or properties are unrelated, regulating separate activities and accumulated separately. In another preferred embodiment of the present invention, these dimensions may be dependent. for example, the calculated dimension or property can be evaluated as a mathematical function whose inputs are a subset of the other dimensions or properties, or the effect of an activity on a property or dimension may be dependent on the values of other properties or dimensions.

In another preferred embodiment of the present invention, an activity is regulated by several of these dimensions or properties: e.g. an activity is allowed to be performed only if either property A is above a certain value or both properties B and C are above two other values. In this case, the effect of the successful activity on the values of properties A, B and C may be dependent on whether it was allowed by A being above the specified value, by B and C or both.

In a preferred embodiment of the present invention, the credits are accumulated, the property being changed by a specific value according to the activity and other parameters regardless of the property's value. In another preferred embodiment of the present invention, the credits are accumulated, but are limited either by a lowest value (lower bound), or highest value (upper bound).

In another preferred embodiment of the present invention, the accumulation of credits is not linear, i.e. the amount of change accrued or consumed by a certain activity or condition is dependent on the previous value of the changed property.

In another preferred embodiment of the present invention, the accumulation of credits is history dependent, i.e. the amount of change accrued or consumed by a certain activity or condition is dependent on the history of the value of the changed property.

In a preferred embodiment of the present invention, several activities may be regulated by the same property, possible according to different value conditions.

In a preferred embodiment of the present invention, the passage of time may reset or otherwise change the value of a certain property. E.g.: credits are accrued over time, consumed over time, or accrued after an amount of time in which a specific activity or condition does not occur. In another preferred embodiment of the present invention, the property is reset to a default level periodically or after an amount of time in which a specific activity or condition does not occur.

In another preferred embodiment of the present invention, instead of the passage of time, the occurrence of a number of operations or a type of operation, preferably out of a specified set, may similarly reset or otherwise change the value of a certain property, e.g. credits are accrued after a certain number of operations, consumed after a certain number of operations, accrued after a certain number of operations in which a specific activity or condition does not occur, or the property is reset to a default level after a certain number of operations in which a specific activity or condition does not occur. Utilizing a number of operations instead of time enables treating an entity according to its participation level and volume of activity.

In a preferred embodiment of the present invention, the values of properties and changes hereof are logged or are used for logging purposes.

In a preferred embodiment of the present invention, when an action is not allowed based on the value of properties, it may be put in quarantine, and be deferred until authorized personnel inspect and approve or reject it.

In a preferred embodiment of the present invention, when an action is not allowed based on the value of properties, it may be rejected outright.

In a preferred embodiment of the present invention, when an action is not allowed based on the value of properties, it may be put in quarantine, and when the future changes of value of the properties make it allowable automatically performed. In another preferred embodiment of the present invention this automatic action is only taken if the value of the properties is larger than a different threshold, preferably larger than the minimum value required to normally perform the action.

In a preferred embodiment of the present invention, when an action is not allowed based on the value of properties, it may be put in quarantine, and when the future changes of value of the properties make it allowable, it can then be performed upon order by the entity originally attempting the action.

In a preferred embodiment of the present invention, authorized personnel may control the properties relating to other personnel entities.

In a preferred embodiment of the present invention, entities may exchange values or properties. E.g. a co-worker may give some of his credit to another co-worker so the second can perform a desirable action, or two co-workers can exchange two types of credits. In a preferred embodiment of the present invention, the exchange is not done on a 1:1 basis, i.e. the act of transfer may cost or accrue credits. In a preferred embodiment of the present invention, the act of transfer is a property-regulated activity.

Figure 4:
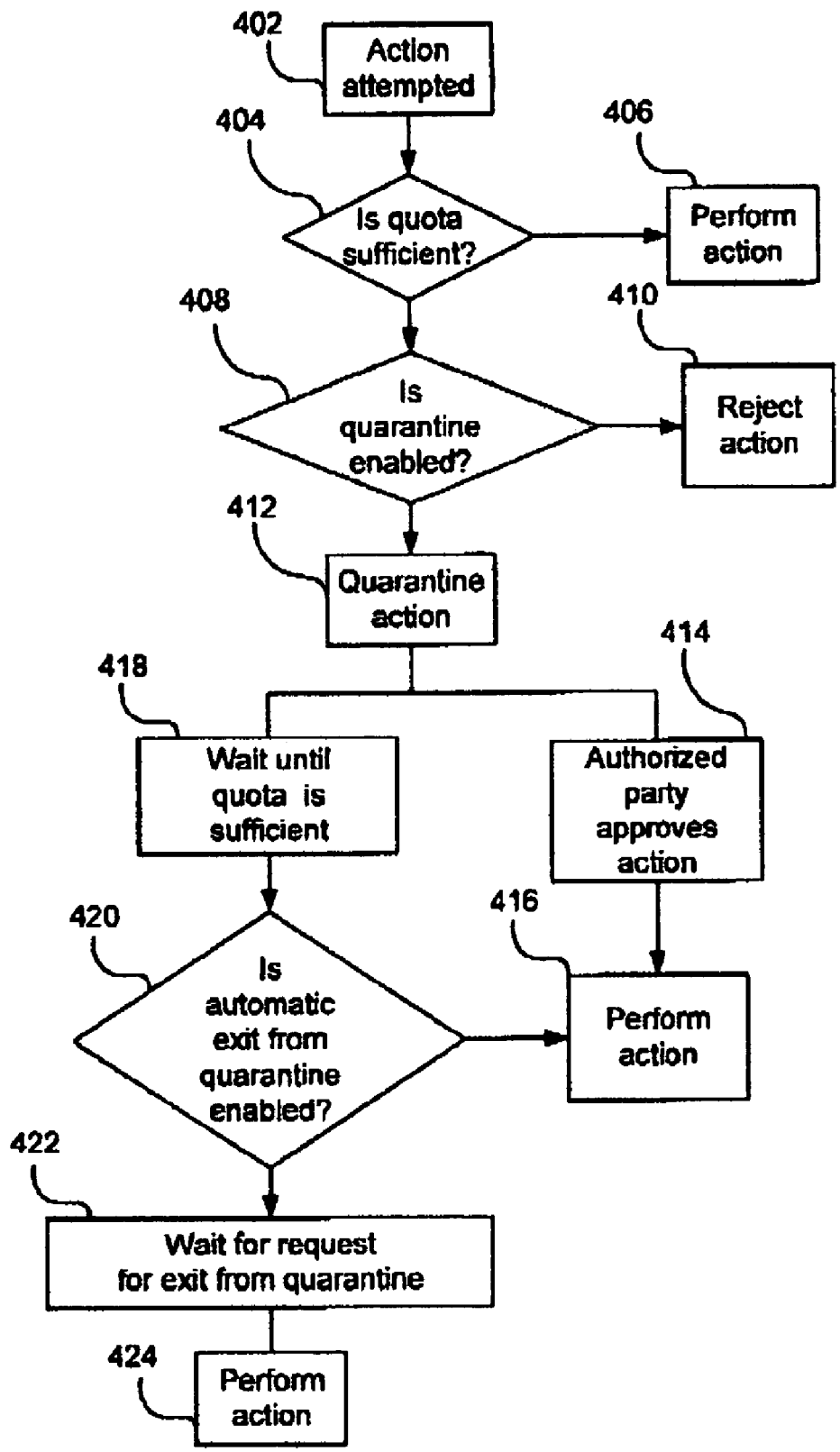
FIG. 4 illustrates workflow in which quarantine occurs in a quota-based scenario, according to a further preferred embodiment of the present invention.

Reference is now made to FIG. 4, which illustrates workflow in which quarantine may occur in a quota-based scenario. When an action 402 is attempted, the system checks whether the quota is sufficient 404. If it is, the action is allowed 406. Otherwise, if there is not sufficient quota to perform the requested action, the policy is checked to ascertain whether quarantine is enabled 408, if it is not, the action is rejected outright 410, otherwise, the action enters quarantine 412, and an authorized party may approve the action 414 causing it to proceed 416, or it may remain in quarantine until the quota is sufficient 418. When quota is sufficient, the policy is again checked, this time to determined if automatic exit from quarantine is enabled 420, if automatic exit from quarantine is enabled the action is performed 416 as soon as there is sufficient quota for automatic exit from quarantine (this value may be higher than the value checked in stage 402 for successful performance of the action in the first place). Otherwise the action is deferred until a request to remove it from quarantine arrives 422 and consequently it is performed 424.

Figure 5:
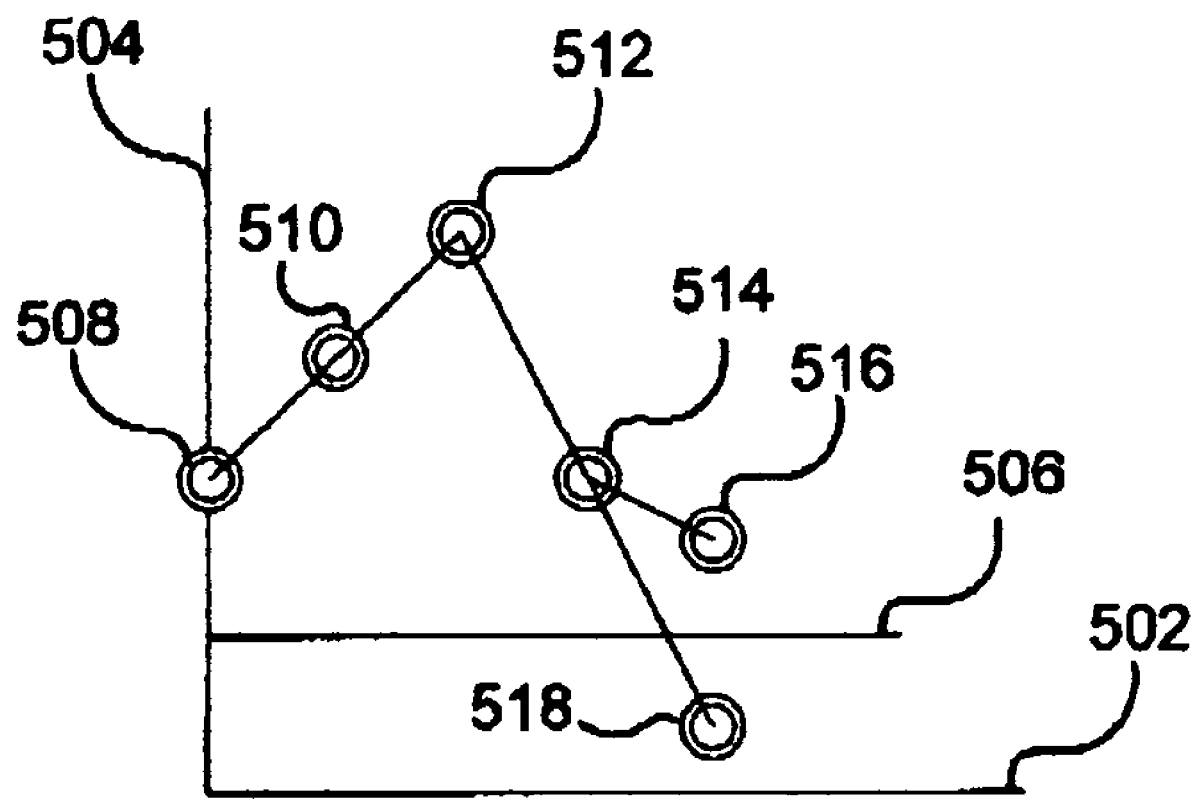
FIG. 5 illustrates the temporal behavior of a quota-related property according to a preferred embodiment of the present invention.

Reference is now made to FIG. 5. The X axis 502 represents the temporal order of actions. A property, charted on the Y axis 504, regulates an action such that the action can only be performed by the entity when the property is above a minimum value 506. The data points, 508, 510, 512, 514, and 516 represent values of the property at different times. The following sequence occurs: after the starting (or default) value 508, the property rises two times after favorable actions take place 510 and 512, the regulated action takes place, and the property is significantly lowered 514, afterwards, an attempt to perform the regulated action takes place, however, the value of the regulating property is not high enough, and a successful performance of the action would lower it beyond the minimum value 504. The action fails, and the property is lowered 516 but not as low as it would have if the action had succeeded 518. Note that it is possible for the property to be lower that minimum value 504 as result of such attempts, especially if they occur in succession, and that the minimum value 504 is not a lower bound in this case.

Figure 6:
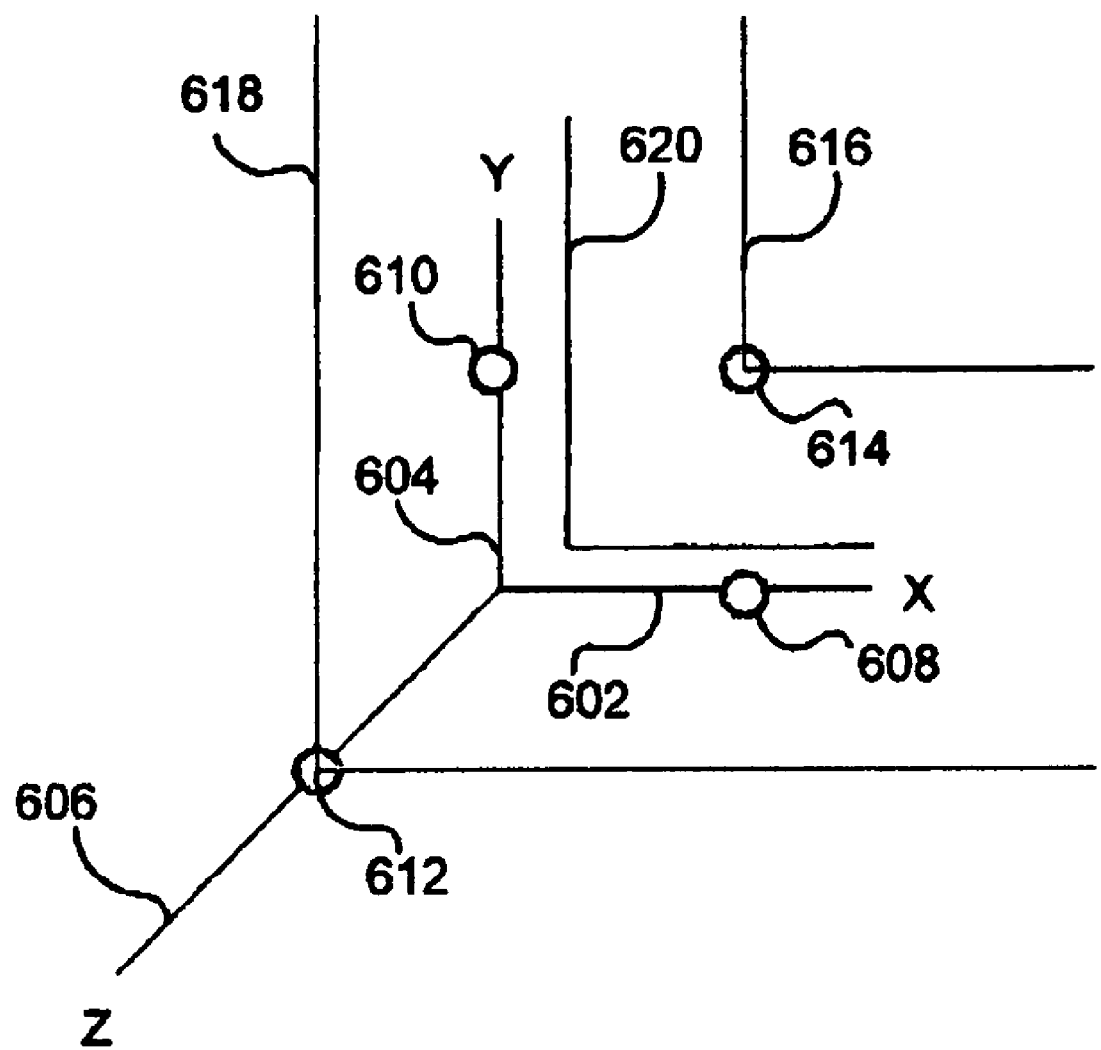
FIG. 6 illustrates a multi-dimensional temporal behavior of a quota-related property according to a preferred embodiment of the present invention.

FIG. 6 illustrates a three dimensional property, or equivalently three different properties regulating the same action. The axes 602, 604 and 606 represent these properties or dimensions. Axis X 602 represent property or dimension A, axis Y 604 represent property or dimension B and axis Z 606 represent property or dimension C. Points 608, 610, and 612 represent minimal thresholds in their respective dimensions or properties, point 608 represents a minimal threshold on A, point 610 represents a minimal threshold on B and point 612 represents a minimal threshold on C. Note that maximum thresholds can be similarly represented. Point 614 on the X-Y plane represents the point on that plane when both A and B are at their minimum threshold values, the segment 616 on that plane represents the area in which both A and B are at or above those values. The second plane 618 represents the plane, parallel to axes X 602 and Y 604 on which the point 612 is located or equivalently, the area in which C is at its minimum threshold value. On this second plane there is a second segment 620, which is he projection of segment 616 on plane 618, and which represents the area in which C is at its minimum threshold value, and A and B are at or near their respective minimum threshold values. FIG. 6 represents a situation where the regulated action is allowed if either C is at or above its minimum threshold value or both A and B are at or above their minimum threshold values, in this situation the action is allowed if the point representing the values of the properties or dimensions 608, 610 and 612 is on a projection of 616 or above on axis Z—here visually closer than—plane 618.

Figure 7:
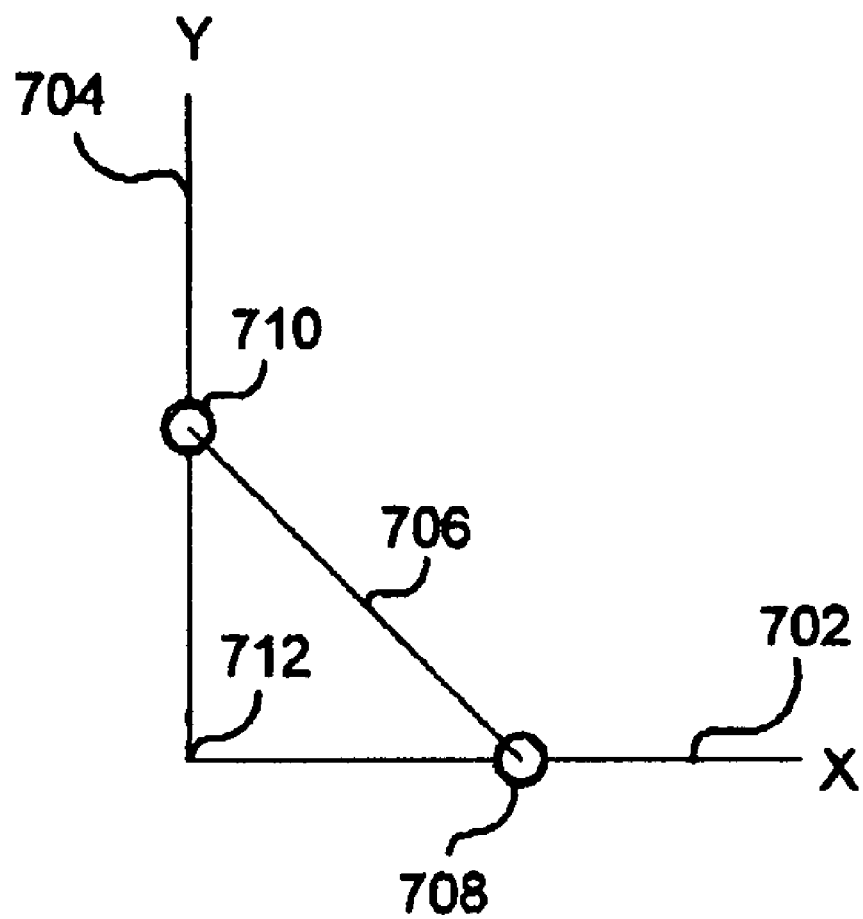
FIG. 7 illustrates a situation where an action is regulated by two properties or dimensions, according to a preferred embodiment of the present invention.

FIG. 7 is a graph that illustrates in simplified terms a situation where an action is regulated by two properties or dimensions, A 702 and B 704 represented by the two axes. The action is allowed if and only if $A+B \geq C$ where C is an arbitrary constant, the line 706 representing $A+B=C$. The minimum threshold values on A 702 and B 704 are $A=C$ 708 and $B=C$ 710 above which the value of a single property or dimension (A or B) is enough to allow the action regardless of the value of the second property or dimension (assuming non-negative values). This configuration can be implemented as a condition on the values of A and B, or as a threshold value on a generated dimension or property D where $D=A+B$. Other conditions may not give both properties an equal importance or scale (e.g. $A+EB \geq C$ where E is an arbitrary constant), may assign some of the properties or dimensions conflicting effect (e.g. $A-B \geq C$), may have a maximum threshold (e.g. $C \geq A+B$), or may not be linear (e.g. $A^2+B \geq C$).

Figure 8:
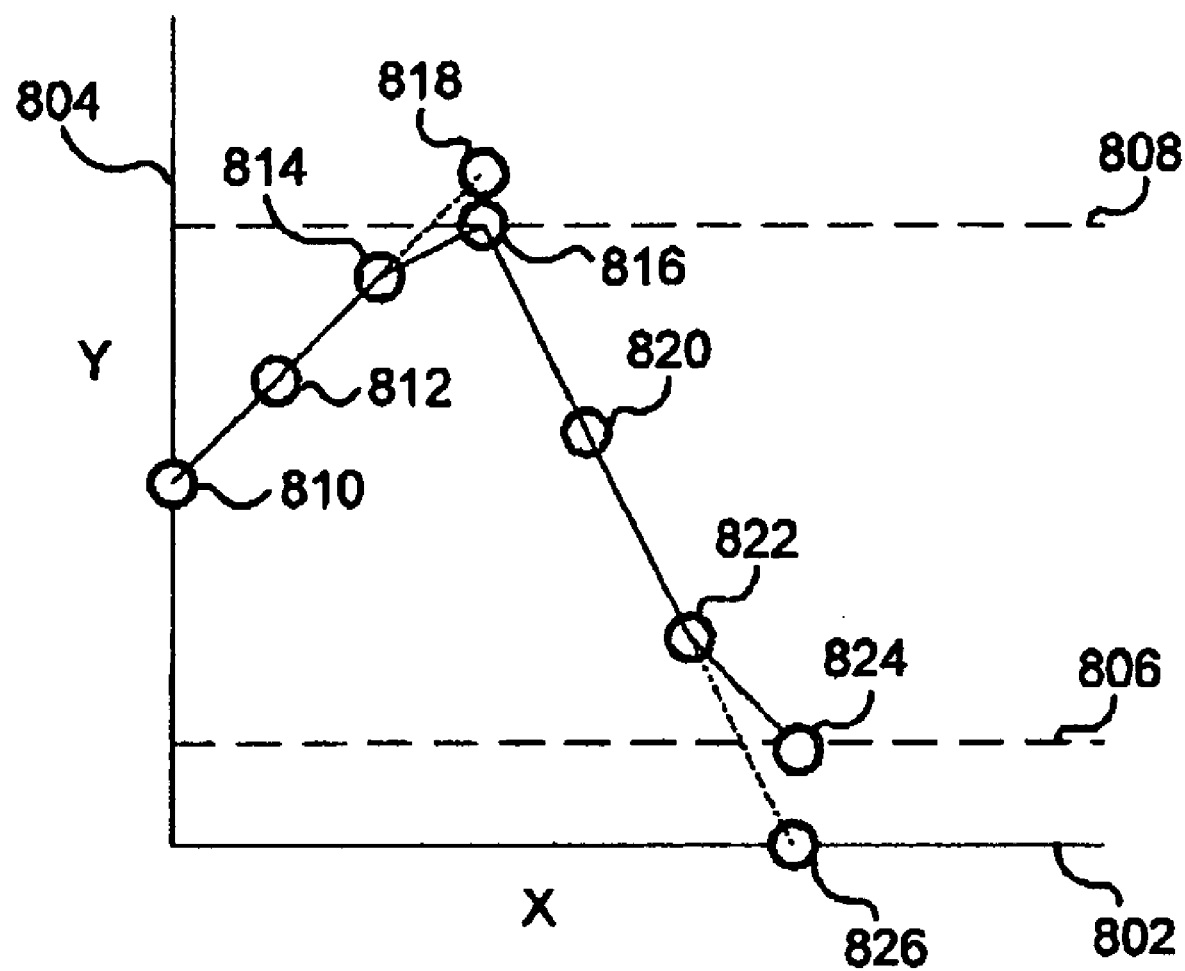
FIG. 8 illustrates additional temporal behavior of a quota-related property, according to a preferred embodiment of the present invention.

Reference is now made to FIG. 8, which again is a graph, this time illustrating the effect of the order of a sequence of events on a property. The X-axis 802 represents the order of the sequence of events having effect on the property 804, represented by the Y-axis. The property 804 has a lower bound 806 and an upper bound 808. In this sequence the property beings with an initial value 810, and moderately rises twice after favorable events 812 and 814 occur. After that, a third favorable event occurs, which would have normally raised the value of the property 802 to a certain value 818, however, that value is higher than the upper bound on the property 808 so the new value of the property is set to that of the upper bound 816. Consequently, two unfavorable events 820 and 822 significantly lower the value of the property 804, then, a third unfavorable event occurs, which would normally lower the value of the property 804 to a certain value 826, however, that value is lower than the lower bound on the property 806 so the new value of the properly is set to that of the lower bound 824.

Figure 9:
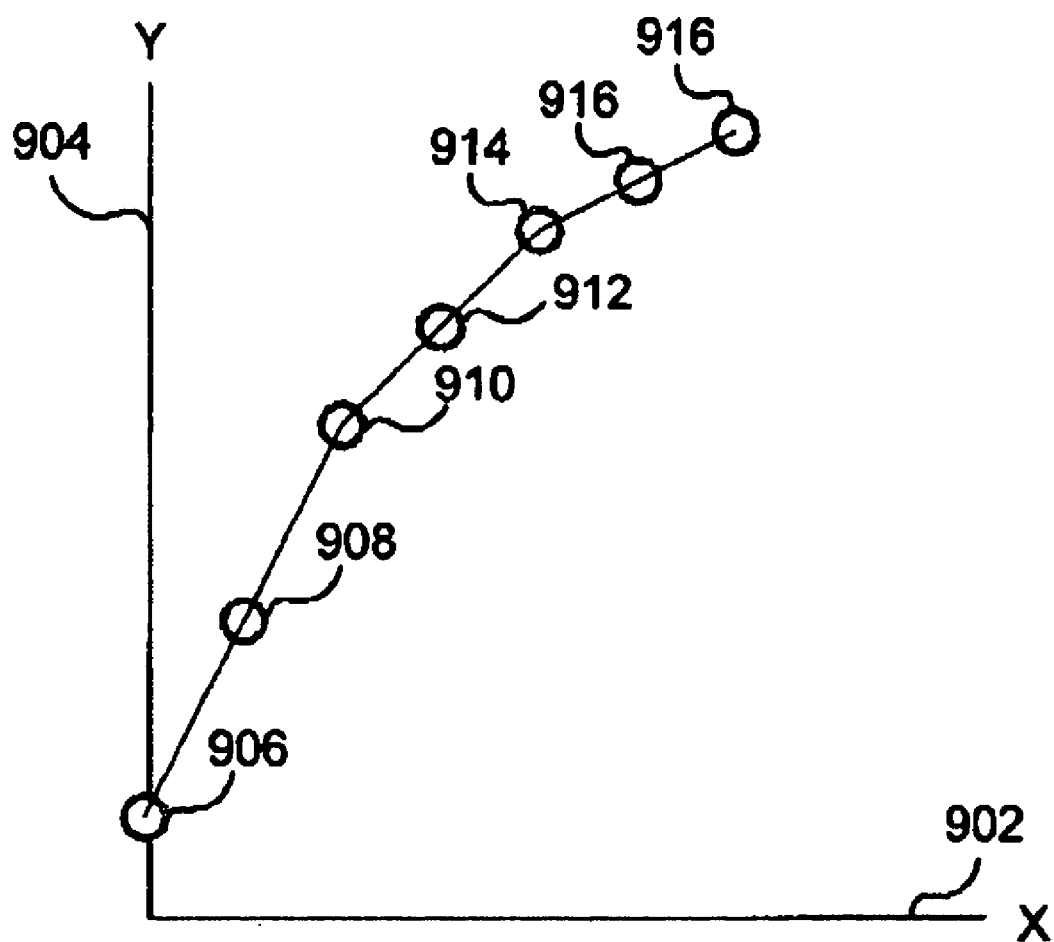
FIG. 9 illustrates yet further temporal behavior of a quota-related property, according to a preferred embodiment of the present invention.

Reference is now made to FIG 9. The X-axis 902 represents the order of the sequence of events having effect on the property 904, represented by the Y-axis. The property 904, is affected by an event, where the effect of the event is influenced by the prior value of the property 904. The property begins with an initial value 906, and it then rises in a sequence of similar events 908, 910, 912, 914 and 916, where the effect of each event is dependent on the value of the property 904, such that the effect gets lower as the value of the property 904 gets higher, events 908 and 910 having a significantly higher effect than events 916 and 918, while events 912 and 914 have a moderate effect on the value of the property 904. This effect can replace, or be used in conjunction with upper or lower bounds.

Figure 10:
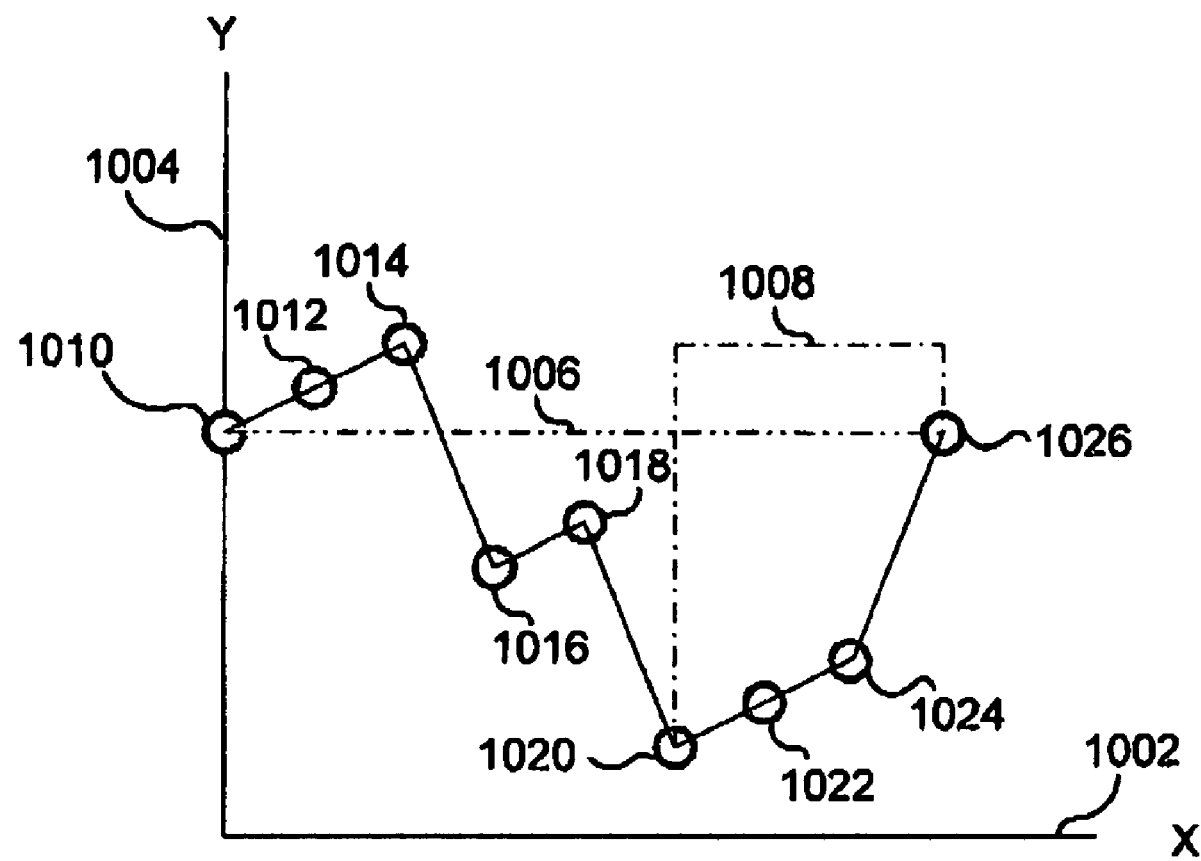
FIG. 10 illustrates yet further temporal behavior of a quota-related property, according to a preferred embodiment of the present invention.

Reference is now made to FIG. 10. The X-axis 1002 represents the order of the sequence of events having an effect on the property 1004, represented by the Y-axis. The property is affected by a sequence of events, 1012, 1014, 1016, 1018, 1020, 1020, 1022 and 1024, and by a timed reset 1026 after a time in which a condition does not occur 1008. The X-axis 1002 represents the order of the sequence of events having an effect on the property 1004. In this sequence the property begins with an initial value 1010 which is also the default value 1006, it then rises moderately twice after favorable events 1012 and 1014, lowers significantly following an unfavorable event 1016, rises again 1018, lowers again 1020, and rises twice again 1022 and 1024, after a timeout 1008 in which no unfavorable event occurs (the condition), the value of the property 1004 being reset 1026 to the default value 1006. This timeout may be based on actual time or a count of events (or events of a specific type). The reset may be absolute (that is the reset occurs regardless of the value of the property) or may be one way (e.g. the reset can only lower or can only raise the value of the property).

In general, there are many parameters that compliance is derived from, and those parameters may have several values. Therefore, compliance can be considered as a matrix or a table, where the columns are the different requirements and the rows are systems and processes. Hence, in most cases, the result of an audit that was performed is a report that lists those issues rather than a simple yes or no. Reference is now made to FIG. 11, which illustrates such a table or a matrix, in which a numeric rank is assigned to each combination of requirement and process, based on the number of cases of non-compliance with a certain requirement within a certain process. In a preferred embodiment of the present invention, the system allows automatically determination of these ranks, by monitoring information distribution and usage within the process. In a preferred embodiment of the present invention, the security or the distribution policy or the usage policy comprises determining the legitimacy of at least one of the following: a set of authorized recipients; a set of authorized usages (described below); a set of allowed formats; a set of allowed channels, and a required action.

In a preferred embodiment of the present invention, the policy comprises distribution regulation, applied for the various electronic distribution channels, for regulating at least one of the following actions:
  Sending the digital item via email;
  Sending the digital item via web mail;
  Uploading the digital item to a web server;
  Uploading the digital item to a FTP server;
  Sending the digital item via a file transfer application;
  Sending the digital item via an instant messaging application;
  Sending the digital item via a file transfer protocol; and
  Sending the digital item via an instant messaging protocol.

In a preferred embodiment of the present invention, the usage defined by the security policy comprises at least one of the following:
  Storage (e.g., in a loci hard disk)
  Copying a file or an excerpt;
  Editing;
  Copying to clipboard;
  Copying an excerpt to clipboard;
  Changing format (e.g., changing the format of a textual document to PDF);
  Changing encoding (e.g., from ASCII to Unicode);
  Encryption and/or decryption;
  Changing digital rights management;
  Opening by an application (e.g., by a word processor);
  Renaming a file.
  Printing.

In a preferred embodiment of the present invention the required action defined by the security policy comprises at least one of the following:
  Preventing distribution of the digital item;
  Preventing storage of the digital item;
  Preventing usage of the digital item, such as editing, copying, printing etc.;
  Reporting, such as:
    Reporting distribution of the digital item;
    Reporting storage of the digital item;
    Reporting usage of the digital item;
  Alerting, such as:
    Alerting about distribution of the digital item;
    Alerting about storage of the digital item;
    Alerting about usage of the digital item;
    Alerting an administrator, such as system administrator;
    Alerting a manager, such as the manager of the group in which the breach happened;
    Alerting a recipient;
    Alerting a sender;
  Logging, such as:
    logging distribution of the digital item;
    logging storage of the digital item;
    logging usage of the digital item;
  Notifying, such as;
    Notifying about distribution of the digital item;
    Notifying about storage of the digital item;
    Notifying about usage of the digital item;
    Notifying to an administrator;
    Notifying to a manager;
    Notifying to a recipient;
    Notifying to a sender;

Notifying to an owner of the keyword, keyphrase or number;

Put the digital item in a quarantine, until a final decision will be taken by an authorized person.

Reporting:
  Reporting to an administrator, such as a system administrator;
  Reporting to a relevant manager;
  Reporting to a recipient;
  Reporting to a sender;
Encrypting the digital item;
Changing the digital item;
Replacing some information object within the digital data item;
Utilizing digital rights management technology on the digital item.

In a preferred embodiment of the present invention, at least some of these actions are performed utilizing methods such as these disclosed in applicant's co-pending PCT patent application PCT/IL03/00889, U.S. Patent Application No. 20020129140, U.S. application Ser. No. 10/357,201, and provisional patent application 60/437,031, the contents of each of which are hereby incorporated by reference. Furthermore, as explained in applicant's co pending PCT patent application PCT/IL03/00889, the contents of which are hereby incorporated by reference, the policy can be dependent on many parameters, such as:

The identity of a user;
The identity of a user requesting an action;
The identity of a user involved in an action;
The identity of a user receiving a digital item;
The authentication level of a system;
The authentication level of a user;
The authentication level of a user requesting an action;
The authentication level of a user authorizing an action;
The authentication level of a user involved in an action;
The authentication level of a user receiving the digital item;
The authentication level of a user sending the digital item;
The format of an digital item instance;
An interface being used;
An application being used;
Encryption being used;
Digital rights management technology being used;
Detection of transformation, wherein the transformation is operable to reduce the ability to identify the transformed digital item;
The digital item integrity;
Regular usage pattern;
Regular distribution pattern;
Regular storage pattern;
Information path;
Consistency of an action with usage pattern;
The identity of a user overriding policy and authorizing the action in respect to the digital item;
The authentication level of a user overriding policy and author the action in respect to the digital item;
The identity of a user sending digital item;
Information property of the digital item;
Language of the digital item;
Representation of the digital item;
Operations done on of the digital item;
Identity of users involved along the life cycle of the digital item;
Application used on of the digital item;
Transition channel of the digital item;
Participant agents;
Virtual location of a computer;
Logical location of a computer;
Physical location of a computer;
The domain of a respective digital item;
The identity of a system;
Type of a computer;
Type of a laptop computer;
Type of a desktop computer;
Type of a server computer; and
The owner identity.

In a preferred embodiment of the present invention the policy comprises placing a substantially imperceptible marking in the digital item, comprising information content, and the method comprises placing the marking, when indicated by the policy, before allowing at least one of the following: storage of the digital item; usage of the digital item; and distribution of the digital item, as explained, e.g., in applicant's co-pending PCT patent application PCT/IL03/00889, the content of which is hereby incorporated by reference.

The present embodiments address the shortcomings of the presently known configurations by providing a method and system for ensuring qualitative and quantitative compliance with distribution and usage, which can efficiently serve current needs for information security and management.

It is appreciated that one or more steps of any of the methods described herein may be implemented in a different order than that shown, while not departing from the spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

A number of features have been shown in various combinations in the above embodiments. The skilled person will appreciate that the above combinations are not exhaustive, and all reasonable combinations of the above features are hereby included in the present disclosure.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

The invention claimed is:

1. A method for enforcing a data security policy quantitatively, the method comprising:
  a. assigning a breach quota, wherein a breach comprises an incompliance with a data security policy specifying permitted actions on digital data, and wherein said quota comprises a quantitative allotment of incompliances with said policy;
  b. monitoring actions upon said digital data to identify breaches and compliances of said policy;
  c. upon detection of a breach of said policy, updating said quota in a first way; and
  d. upon detection of compliance with said policy updating said quota in a second way;
  e. determining quantitatively if said identified breaches exceed said quota; and if said quota is exceeded selecting between:
    i. keeping respective digital data in quarantine until a necessary quota becomes available; and ii. blocking an action which exceeds said quota, thereby enforcing said data distribution policy quantitatively.

2. A method according to claim 1, further comprising deducting a numerical value corresponding to said breach from said quota following said determining that said action comprises said breach.

3. A method according to claim 1, wherein said policy specifies a property associated with a digital item, and further comprising determining a legitimacy of an action relating to said digital item by comparing said property to said specification, said property comprising one of a group consisting of:
a set of authorized recipients;
a set of authorized usages;
a set of allowed formats; and
a set of allowed distribution channels.

4. A method according to claim 1, further comprising sending reports to users regarding the status of a respective quota.

5. A method according to claim 1, further comprising sending warnings to users whenever a respective remaining quota is low.

6. A method according to claim 1, wherein said quota is assigned on a time basis.

7. A method according to claim 1, wherein a respective quota is assigned to at least one user based on credits that are assigned to said at least one user.

8. A method according to claim 1, wherein said enforcing is performed on a per-user basis, in accordance with a respective quota assigned to at least one user.

9. A method according to claim 8, wherein said respective quota is assigned in accordance with a property attached to said at least one user.

10. A method according to claim 8, wherein said respective quotas are assigned to users based on a default policy.

11. A method according to claim 1, wherein said policy specifies a required action comprising at least one of the following:
preventing distribution of said digital item;
reporting distribution of said digital item;
alerting about distribution of said digital item;
logging distribution of said digital item;
notifying about distribution of said digital item;
quarantine;
encrypting said digital item;
changing said digital item;
replacing an information object with said digital data item; and
utilizing digital rights management technology on said digital item.

12. A method according to claim 1, wherein said action comprises at least one of the following:
storage;
copying a file;
copying an excerpt;
editing;
copying to clipboard;
copying an excerpt to clipboard;
changing format;
changing encoding;
renaming a file;
encryption;
decryption;
changing digital management;
opening by an application; and
printing.

13. A method according to claim 1, wherein said policy comprises distribution regulation, said distribution regulation being for regulating at least one of the following:
sending said digital item via mail;
sending said digital item via web mail;
uploading said digital item to a web server;
uploading said digital item to a FTP server;
sending said digital item via a file transfer application;
sending said digital item via an instant messaging application;
sending said digital item via a file transfer protocol; and
sending said digital item via an instant messaging protocol.

14. A method according to claim 2, wherein said numerical value assigned to at least one type of breach of said policy corresponds to the level of offense of said type of breach.

15. A method according to claim 9, wherein said property is a multi-dimensional function, and wherein the method comprises using said function to assign said quota to a respective user.

16. A method according to claim 9, wherein said property is a non-linear accumulation function, and wherein the method comprises using said function to assign said quota to a respective user.

17. A method according to claim 1, further comprising assigning quotas to respective users within an organization according to their respective positions within an organizational structure.

18. A method according to claim 17, wherein said assigning is according to a vertical position within said structure.

19. A method according to claim 17, wherein said assigning is according to a horizontal position within said structure.

20. A method according to claim 1, wherein said policy is applied with respect to a digital medium, and wherein said digital medium comprises a distribution channel or storage medium.

21. A method for automatically estimating a compliance table, said compliance table comprising requirements for quantitative compliance with a data security policy for data distribution or usage over a communication network, the method comprising:
a. constructing a compliance table, said table comprising cells, said cells having a first dimension representing said requirements for compliance with said data security policy and said cells having a second dimension representing subjects for said data distribution or usage;
b. initializing values in said table to an a-priori set of compliance values;
c. assigning respective numerical values to at least two types of breach for at least two subsets of the cells within said table;
d. monitoring information distribution or usage covered by said policy in order to detect breaches of said policy;
e. upon detection of a breach of said policy, updating said set of compliance values within said table in a first way, and upon detection of compliance with said policy updating said set of compliance values within said table in a second way,
wherein said subjects for said data distribution or usage comprise at least one of a group consisting of: a set of processes, a set of processors, a set of network nodes and a set of data distribution channels.

22. The method of claim 21, further comprising evaluating a total compliance score based on said compliance table.

23. The method of claim 21, further comprising providing a final decision regarding compliance based on said compliance table.

24. The method of claim 21, wherein said a-priori set of compliance values is determined manually.

25. An apparatus for quantitatively determining compliance with a data security distribution or usage policy applied with respect to a digital medium, the policy defining at least two types of breach, the apparatus comprising:
- f. a first module of a data security policy reference monitor for assigning numerical values to respective types of breaches of said policy;
- g. a quota assignor for assigning a quota of breaches of said policy to at least one user subjected to said policy, said quota being expressed in terms of said numerical value;
- h. a traffic monitor and analyzer for monitoring information distribution or usage covered by said policy in order to detect breaches and compliances of said policy by users;
- i. a second module of a policy reference monitor which, upon detection of compliance with said policy updating said quota in a first way, and upon detection of an action carrying out one of said types of breaches of said data security policy by a given one of said users, updating said quota in a second way such that the module is configured to carry out the following actions:
  - iii. determining whether a numerical value has been assigned to the respective type of said breach;
  - iv. comparing said numerical value assigned to said type of breach with a respective quota assigned to said given user, and
  - v. allowing said action to be executed only if said comparing indicates that said respective quota assigned to said given user is sufficient to cover said breach, and
  - vi. instructing said quota assignor to deduct said numerical value assigned to said type of breach from said respective quota assigned to said given user.

26. A method according to claim 9, wherein said property is based on at least one of:
the level of said at least one user within the organization;
the department to which said at least one user belongs, and
the past behavior of said at least one user.

27. A method according to claim 1, wherein an action comprises distribution of said digital data.

28. A method according to claim 1, wherein an action comprises usage of said digital data.

29. A method according to claim 1, wherein said digital data comprises one a group comprising: a document, a file, an email, and an instant message.

30. A method according to claim 7, wherein said credits are assigned to a user in accordance with past actions of said user.

31. A method according to claim 1, wherein said action comprises copying an excerpt from said digital data.

32. A method according to claim 1, wherein said action comprises encrypting said digital data.

33. A method according to claim 1, wherein said action comprises printing said digital data.

* * * * *